ations Priority Data
United States Patent [19]
Baron et al.

[11] 4,171,966
[45] Oct. 23, 1979

[54] METHOD OF AND APPARATUS FOR PRODUCTION OF PLATE GLASS

[75] Inventors: Dietmar Baron, Cologne; Rudolf Pelzer, Herzogenrath; Premek Stepanek, Garmisch Partenkirchen, all of Fed. Rep. of Germany

[73] Assignee: Klockner-Humboldt-Deutz AG, Fed. Rep. of Germany

[21] Appl. No.: 897,913

[22] Filed: Apr. 19, 1978

[30] Foreign Application Priority Data

Apr. 19, 1977 [DE] Fed. Rep. of Germany ....... 2717238
Oct. 7, 1977 [DE] Fed. Rep. of Germany ....... 2745160
Oct. 8, 1977 [DE] Fed. Rep. of Germany ....... 2745441

[51] Int. Cl.² ............................................. C03B 5/26
[52] U.S. Cl. .................................. 65/99 R; 65/99 A; 65/100; 65/183; 65/164; 65/327; 65/329
[58] Field of Search ................... 65/65, 183, 92, 99 R, 65/100, 327, 329, 164, 99 A, 193

[56] References Cited

U.S. PATENT DOCUMENTS

| 820,971 | 5/1906 | Harvey | 65/164 |
|---|---|---|---|
| 1,999,562 | 4/1935 | Galey | 65/65 |
| 3,244,495 | 4/1966 | Apple et al. | 65/327 X |
| 3,268,321 | 8/1966 | Chapman | 65/183 |
| 3,320,849 | 5/1967 | Cumberland | 65/158 X |
| 3,346,359 | 10/1967 | Forster et al. | 65/183 |
| 3,355,275 | 11/1967 | Sensi et al. | 65/99 A |
| 4,062,666 | 12/1977 | Tilton | 65/65 |

FOREIGN PATENT DOCUMENTS

| 77229 | 7/1919 | Austria | 65/92 |
|---|---|---|---|
| 601981 | 12/1925 | France . | |

*Primary Examiner*—Arthur D. Kellogg
*Attorney, Agent, or Firm*—Hill, Van Santen, Steadman, Chiara & Simpson

[57] ABSTRACT

A method and apparatus is disclosed for the production of plate glass. A glass melting furnace containing molten glass connects with an outflow furnace in such fashion that central layers of molten glass in the glass melting furnace are conveyed to the outflow furnace. The outflow furnace connects with an outflow nozzle which forms a flat glass band from which the plate glass is cut. The outflow speed of the glass band issuing from the outflow nozzle is regulated by a static pressure adjustment determined by a height of the molten glass in the separate outflow furnace. A supply channel to the nozzle preferably contains heating electrodes for resistance heating of the molten glass prior to issuance from the nozzle.

44 Claims, 10 Drawing Figures

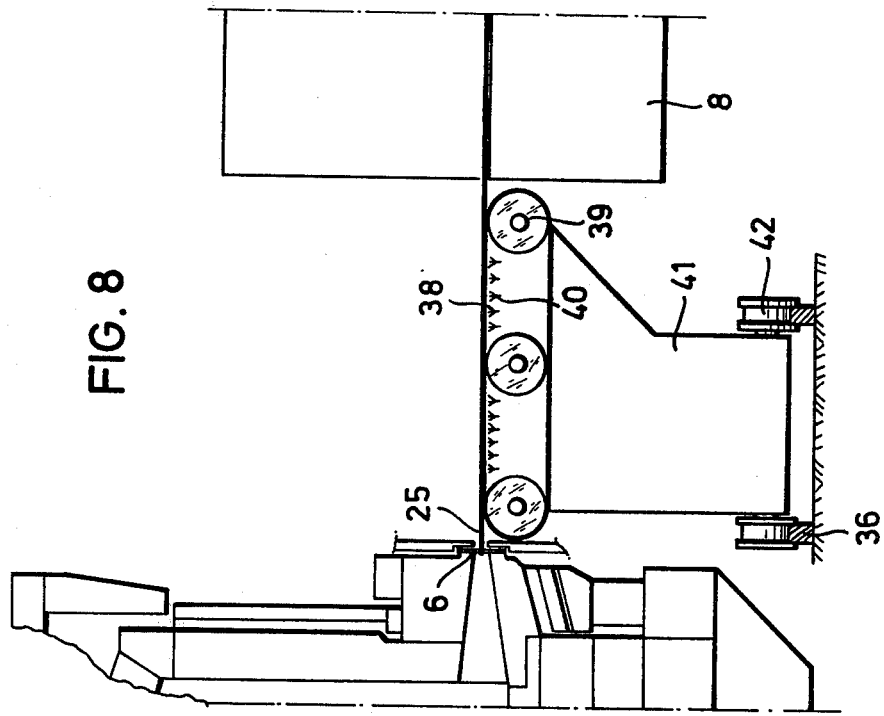
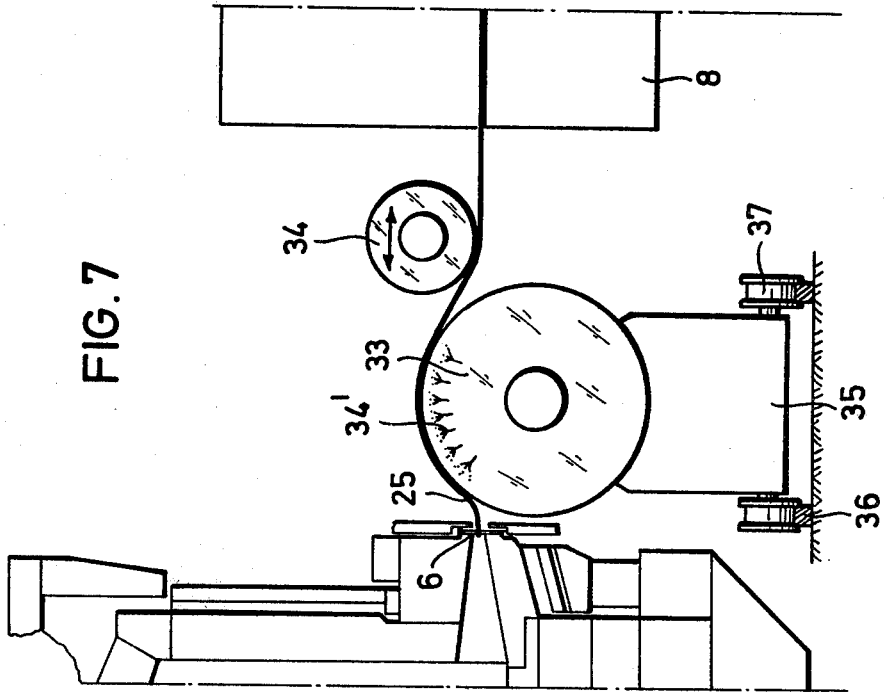

METHOD OF AND APPARATUS FOR PRODUCTION OF PLATE GLASS

DESCRIPTION

The invention relates to a method for the production of plate-glass, in which the glass is melted in a glass-melting furnace and is formed by means of a nozzle into a glass band.

For the production of plate-glass, a number of methods are known, which operate partially vertically like the Foucault, Pittsburgh, and Colburn methods, or horizontally like the float-glass method. The vertical outflow methods have, in this connection, the disadvantage that their outflow output is low, and only relatively narrow and short glass panels may be produced. The horizontally operating float glass method is indeed better with respect to the drawing output, occasioned by the utilization of a metal bath, however, brings with it appreciable technological difficulties. The investment expenditure in the case of this method is high.

It is the object of the invention to provide a production method for plate-glass which does not have the mentioned disadvantages, provides a glass with especially good optical characteristics and in particular, permits of a regulability of the quantity of production within wide limits.

The object is solved thereby, that through static pressure in front of the nozzle, the outflow speed of the glass out of the nozzle is regulated. Through this measure, it is possible to alter the glass flow out of the outflow nozzle within the scope of further limits, as the drawing output is directly dependent on the hydrostatic height of pressure of the molten glass made use of. Beyond this, the free outflow results in a distortion-free glass.

In one embodiment of the invention, it is provided that the glass arrives out of the melting furnace into a separate outflow furnace, in which the static pressure regulating the outflow speed is adjusted. Through the construction of a separate outflow furnace, it is attained that the bath level of the glass in the melting furnace may be adjusted independently of the outflow process, and that advantageously for the adjustment of the level of the glass bath which is responsible for the outflow speed of the glass out of the nozzle, a separate chamber easily regulable in the glass bath level is available.

It is furthermore provided that for the production of the plate-glass, the glass located in the lower part of the melting furnace is used. Hereby it is attained that the glass supplied to the nozzle is especially homogeneous, particularly with reference to its composition and temperature, and that in respect of its optical quality, it surpasses the previously known glasses.

It is further provided that the glass is taken out of a layer with spacing to the surface and to the bottom of the melting furnace, and on the way from the outflow-furnace to the nozzle is completely or partially subjected to an after-heating. Through this measure, according to the invention, it is advantageously attained that actually only glass of the same temperature and homogeneous composition reaches the nozzle, and that the glass reaching the nozzle flows out of the same uniformly.

In further embodiment, it is provided that at the outlet end of the melting furnace, streams of glass circulating on the surface or on the bottom, respectively, are adjusted by means of heating or cooling, respectively. Through the adjustment of circulating streams on the surface and on the bottom, the removal side of the glass-melting-furnace is stabilized according to flow. Hereby, a particularly good temperature constancy and homogeneous composition is attained, as the two circulating streams of glass cover the upper and lower area of the melting furnace. The breaking-in of the glass out of the surface or from the bottom of the melting furnace, which has bath temperature differences and nonhomogeneousness inherent, is accordingly out of the question.

In further development of the invention, it is provided that the glass leaves the melting furnace over a preferably cooled threshold or sill. Through this measure, it is advantageously insured that no glass reaches from the layers directly on the floor of the melting furnace into the outflow-furnace. The cooling of the threshold or sill takes care that the glass drops down directly in front of the threshold or sill, and the bottom-glass pushes back in direction to the center of the melting furnace. In order to prevent that surface-glass can reach the outflow-furnace, through the heating, correspondingly a glass movement is produced on the surface, which leads away from the outflow-furnace.

In further development of the invention, it is provided that the after-heating in front of the nozzle is regulable and is differently adjustable over the nozzle width. Through this measure, it is attained that temperature differences which have been adjusted in spite of the removal of the glass from the most favorable layer of the melting furnace, may be equalized. In this manner, it is insured that the temperature and therewith also the viscosity of the glass entering into the nozzle is equal over the entire nozzle width.

In further development of the invention, it is provided that for the regulation of the after-heating, the thickness of the glass-band is utilized. As the aim of the production process is a band of plate-glass lying within the tolerance, this measuring size offers especial advantages although it is indirect. It may, particularly, after installation of a laser-measuring device, be continuously determined very accurately.

It is further provided that the glass reaches from the lower part of the melting furnace to the lower part of the outflow-furnace and flows out of the lower part of the melting furnace through the nozzle. In this way, it is insured that actually only glass from the lower part of the melting furnace, without rising, enters into the nozzle. It is accordingly a fact that neither must one deal with impurities nor with decompositions or cold strands. Inclusions of air, glass bubbles, etc., likewise do not occur.

It is further provided that the plate-glass passes out of the outflow furnace through a nozzle whose outlet opening corresponds to a far-going extent to the width and thickness of the finished flat band. Through this construction of the outflow nozzle, it is attained that subsequently no widening and/or elongation of the glass bath in the outflow furnace is to be regulated. Through the regulating member, the quantity of the glass flowing into the outflow furnace in reference to the quantity of outflow out of the nozzle is regulated so that hereby the level of the glass bath in the outflow furnace is either held constant or may be attained inaltered.

Further, it is provided that the outflow gap of the flat nozzle is regulated in its width and/or breadth. Hereby it is possible to adjust the particular requirements corresponding to the altered dimensions of the glass and to produce on one installation, glass-bands variable within wide limits.

In development of the invention, it is further provided that the glass after outflow from the nozzle is first rapidly brought to a temperature range in which it is viscously plastic, particularly in the temperature range between 750° C. and 850° C. Through the particularly rapid cooling, it is attained that the plate-glass band formed to completion subsequently no longer changes in its measurements, as it is non-sensitive to mechanical influences after cooling.

In one embodiment of the invention, it is provided that the cooling in the viscous plastic condition through direct heat transfer takes place to a solid or liquid body. Through the direct heat transfer to a solid or liquid body, a cooling is attained as rapidly as in seconds without the disadvantages of a turbulent gas flow which does not cool completely, constantly occurring. Thus, an advantageous uniform heat-offtake is to be attained, rapidly over the width of the band.

Further, it is provided that the plate-glass after its outflow from the nozzle is smoothed and cooled by means of at least one heat-offtake apparatus. This cooling apparatus preferably cools the glass band issuing from the nozzle and at the same time smooths its under side.

It is further provided that the plate-glass band behind the heat-offtake apparatus is fire-polished. Through the fire-polishing, a particularly good surface is obtained, as subsequently residual outflow stresses are present on the smoothing and cooling rollers in the outer area of the glass band, which bring about an equalization of eventually present grooves or furrows or the like upon a softening or plasticizing of the surface.

It is furthermore provided that the plate-glass reaches behind the heat-offtake apparatus a supporting hot gas layer, on which it is heat-treated, through the utilization of the hot gas layer, it is advantageously prevented that in this area, in which the glass surface is still very soft, a contact between glass and supporting parts takes place. The static pressure to be utilized may advantageously be held very low, thus for example, there is already sufficient a static pressure of circa 10 mm. water-column. Advantageously, the gas of the hot gas table is heated in order to prevent a one-sided cooling of the glass band. Resting on the hot gas layer there takes place a temperature drop upon simultaneous temperature equalization for the glass, so that the glass is adapted to the subsequent cooling in the cooling furnace, into which the plate-glass band subsequently passes. Here it is cooled to processing temperature, so that it may subsequently be cut and stacked.

In carrying out the method for the production of plate-glass, an apparatus is provided in which the glass is melted in a glass-melting furnace and whereby in the lower part of the melting furnace an outlet opening is arranged which discharges into the lower part of a outflow furnace. Hereby an apparatus is advantageously available which permits of taking glass from the melting furnace in its lower area and transferring it into the outflow furnace, in which a different level of the molten glass permits of being adjusted, which regulates the outflow speed of the plate-glass.

In development of the apparatus, it is provided that the outflow furnace has in its lower part a nozzle changeable in the gap width and gap breadth as outlet opening for the plate-glass. Through the arrangement of the nozzle in the lower part of the outflow furnace there results a great outflow pressure and an advantageous direct transition of the glass into the nozzle, which is adaptably constructed as to the required plate-glass dimensions.

In an embodiment of the apparatus it is provided that the melting furnace has on its outflow side a threshold or sill which is preferably cooled and that somewhat above the threshold or sill are arranged heating apparatus, particularly electrodes. Through the cooling of the threshold or sill, the glass located there is brought to dropping and flows from the threshold or sill back out of the bottom of the furnace while the electrode heats the glass above the removal point of the glass from the furnace, so that it rises to the surface and flows back from here on the surface in direction to the center of the melting furnace. In this way, there result advantageously the two circulating streams of glass.

It is further provided that the channel between the outflow furnace and the nozzle has temperature equalizing electrodes. Through this construction, an advantageous embodiment is available which insures substantially improving the band of plate-glass, as in this way non-homogeneous qualities of temperature occurring may be equalized.

It is further provided that in the channel between outflow furnace and nozzle, heating electrodes are arranged above and below which preferably are constructed, on the one hand, as continuous band electrodes, and, on the other hand, as individual plates, whereby the individual electrodes lying opposite the continuous band electrode are constructed particularly trapeze-shaped and are arranged in two rows, and whereby the second row covers the passages between the electrodes of the first row. Through this construction of the electrodes, advantageously an after-heating apparatus is available, which is held as simple as possible and still makes possible an accurately controlled current introduction on all cross-sectional sectors of the inlet channel to the nozzle. In connection with a selective voltage regulation for the electrodes, there results the possibility of so controlling the individual cross-sectional sectors of the nozzle inlet temperature-wise corresponding to the deviation occurring of the thickness of the glass band, that the deviations are equalized. According to the principle of the friction-loaded flow, there results namely at the colder places in the cross-section at which the glass flows out more slowly, a thin place in the glass band. The measuring of the thickness of the glass band results accordingly indirectly in the temperature distribution in front of the nozzle, so that the band thickness is adapted as indicator for the condition of the glass in front of the nozzle. Thus, the temperature in front of the nozzle does not need to be measured directly, which is connected with considerable expenditure.

In development of the invention, it is further provided that the band electrode and/or the individual electrodes are embedded in a conducting ceramic material, whereby the embedding material for the after-heating electrodes contains material particles, for example, silver, which increase the conductibility of the material. Through this arrangement, it is advantageously attained that the electrodes must not be directly in connection with the liquid glass, but may be embedded in the masonry or brick-work. In addition to advantages in the carrying out of the electrodes as to material, there results also a great scattering of the current flow or conduction out over the surfaces of the individual electrodes and thereupon a uniform heating of the glass.

In another embodiment, it is provided that the individual electrodes are arranged movably and are conveyable in desired positions over the nozzle width. This embodiment is especially suitable then when the glass arrives already with relatively uniform temperature at the entry of the channel between outflow chamber and nozzle. In this case, one or several conveyable electrodes are provided which in each case are conveyed to the places where unusual deviations of the glass temperature occur.

It is further provided that at the transition melting furnace—outflow furnace, a device regulating the quantity of flow through and in the outflow furnace, measuring and regulating-devices are arranged for the glass level height and the condition of the glass. By means of the device for regulating the quantity of flow through the quantity of glass issuing out of the melting furnace may advantageously be so regulated that it corresponds to the outlet quantity of the outflow furnace, so that the glass level height responsible for the quantity of outflow does not change. At the same time, it is possible by means of the device regulating the quantity of flow-through, to adjust the quantity of glass issuing from the outflow furnace, as the height of the glass level in the outflow furnace is automatically so adjusted that the quantity of glass issuing out of the flat nozzle corresponds to the quantity of glass issuing from the melting furnace.

With constant bath height or level in the outflow furance, for a constantly uniform issue of the glass from the flat nozzle, a constant viscosity of the glass must be present, therefore there are arranged in the outflow furnace, measuring and regulating devices for the bath level and the condition of the bath. In this way, it is insured that the outflow operation out of the nozzle may be carried out constantly with the specifically most favorable values.

In development of the apparatus, it is further provided that directly behind the nozzle there is arranged a special liquid-cooled heat offtake apparatus which is in contact with the glass band issuing from the nozzle. Through this heat offtake apparatus, particularly a rotatable heat offtake body, it is possible through a regulation of the quantity of cooling liquid to undertake rapidly and reliably the desired lowering of the temperature.

In development of the apparatus, it is further provided that the heat offtake apparatus is constructed as advantageously insertable and removable cooling roller or drum, respectively. Such a cooling roller or drum, which consists of metal resistant to high heat, and is easily coolable in its interior by means of a liquid, particularly water or oil,—cools, smooths and at the same time guides the issuing band of glass. Through the cooling roller or drum, respectively, also the form of the slack curve of the glass band may be influenced, so that with the aid of such a drum or roller, an element is available which takes care both of the uniform take-up and smoothing of the glass band gushing out of the nozzle, as well as also of the immediate cooling of this band at a lower temperature level. In this way, the cooling roller or drum, respectively, is produceable, relatively simply and without great expenditure.

In a further development, it is provided that the heat offtake apparatus is constructed as metal band which is arranged on a frame preferably conveyable in or out. Upon the utilization of a metal band, it is possible to permit the glass band advantageously to mount or run up on a level surface so that here the further transport of the cooled band is especially simple. The cooling of the band may just as with the roller or drum, respectively, follow or take place simply by means of a liquid.

In further development of the invention, it is provided that the heat-offtake apparatus is constructed as cooling both of molten metal, preferably covered with a protective-gas-atmosphere. This embodiment has the advantage that upon cooling off, a bath-polishing of the under side of the glass band is carried out. At the same time, an improvement in tolerance takes place.

In a further development of the invention, it is provided that the heat-offtake apparatus is constructed as preferably conveyable ornamental glass swaging apparatus of the known embodiment, which has a cooled gas-cushion table. In this embodiment, the heat-offtake body is divided in two and is constructed in form of a pair of rolls, which have profiled surfaces. Thus it is advantageously possible to attain both a rapid cooling as well as also a profiling of the glass band.

Furthermore, it is provided that in front of the heat-offtake apparatus, a wire-lattice-feed-device is arranged. In this way, it is advantageously possible also to produce wired glass. The preferably introduceable wire-lattice-supply-device is arranged in front of the cooling device, here the glass is still sufficiently liquid or molten so that the wire-lattice can penetrate into the glass. Thus is so of no consequence whether the heat-offtake body consists of non-profiled or of profiled rollers.

In a further embodiment, it is provided that on the upper side of the glass band a top-smoothing drum or roller polished to a high burnish is arranged. Hereby, advantageously also the upper side of the glass band is smoothed. It is furthermore provided that behind the nozzle and/or behind the heat-offtake apparatus, heat-treatment apparatus are arranged. Through the heat-treatment apparatus, whether it may be a question of both gas burner or electric radiator as well as also of cooling apparatus, for example, suction conduits which suck in the surrounding air for the cooling of the surface of the glass band,—in each case according to requirement, a heating or cooling of the glass band is carried out. In this way, differences which are adjusted thru different speeds of the glass band and surrounding influences, may be equalized, so that behind the smoothing and cooling rollers, before the entry into the further treatment steps, a flat glass band is present adapted for the further processing.

It is further provided that in the area of the heat treatment apparatus, at least one gas-cushion table is arranged. Gas-cushion-tables permit very advantageously that the glass band is carried on a layer of supporting air without contact with solid bodies. Through the layer of supporting air, likewise a heat treatment is attained; in dependence upon the temperature there results for example, a different cooling. The layer of supporting air is preferably produced thereby, that compressed air flows with a low pressure (10 to 20 mm. water column) through porous ceramic material or through a surface formed like a sieve. Through the resting on the layer of supporting air, damages to the lower side of the glass band in the area in which the surface of the glass band on account of its high temperature is still vulnerable,—are prevented.

Further, it is provided that behind the heat treatment apparatus, a cooling furnace is arranged. In this cooling furnace, in manner known per se, the glass band is cooled further to a temperature of circa 100° C. to 200° C. The glass is now free from tension and may be cut automatically without problems.

It is furthermore provided that on the glass band, devices measuring the glass thickness are arranged. Through the devices for measuring the glass thickness, the glass thickness is continuously measured and supervised. Preferably traversing devices are installed which continuously migrate over the glass band and indicate the thickness of the glass.

Further, it is provided that the surface of the nozzle, has a wear-protection, particularly of metal-carbide and that the nozzle is constructed as flat nozzle and has nozzle girders which are carried out in several parts and are individually adjustable. Through the reinforcement of the nozzle with metal carbide, a high durability is attained, especially when the metal carbides are applied through explosion-electroplating and thereupon have a high density and a good combination with the basic material. The durability resulting from this, was previously not attainable for this type of nozzles. Through the construction in several parts, the application of the wear-protection is facilitated. That the nozzle-girders are individually adjustable, permits of the separation of coarse- and fine-adjustment for the gap-width of the flat nozzle.

The invention will be explained in greater detail on the basis of drawings which show the further details.

IN THE DRAWINGS

FIG. 7 shows heat offtake bodies constructed as cooling roller or drum, respectively;

FIG. 8 shows a heat-offtake body constructed as cooling band.

Figure 1:
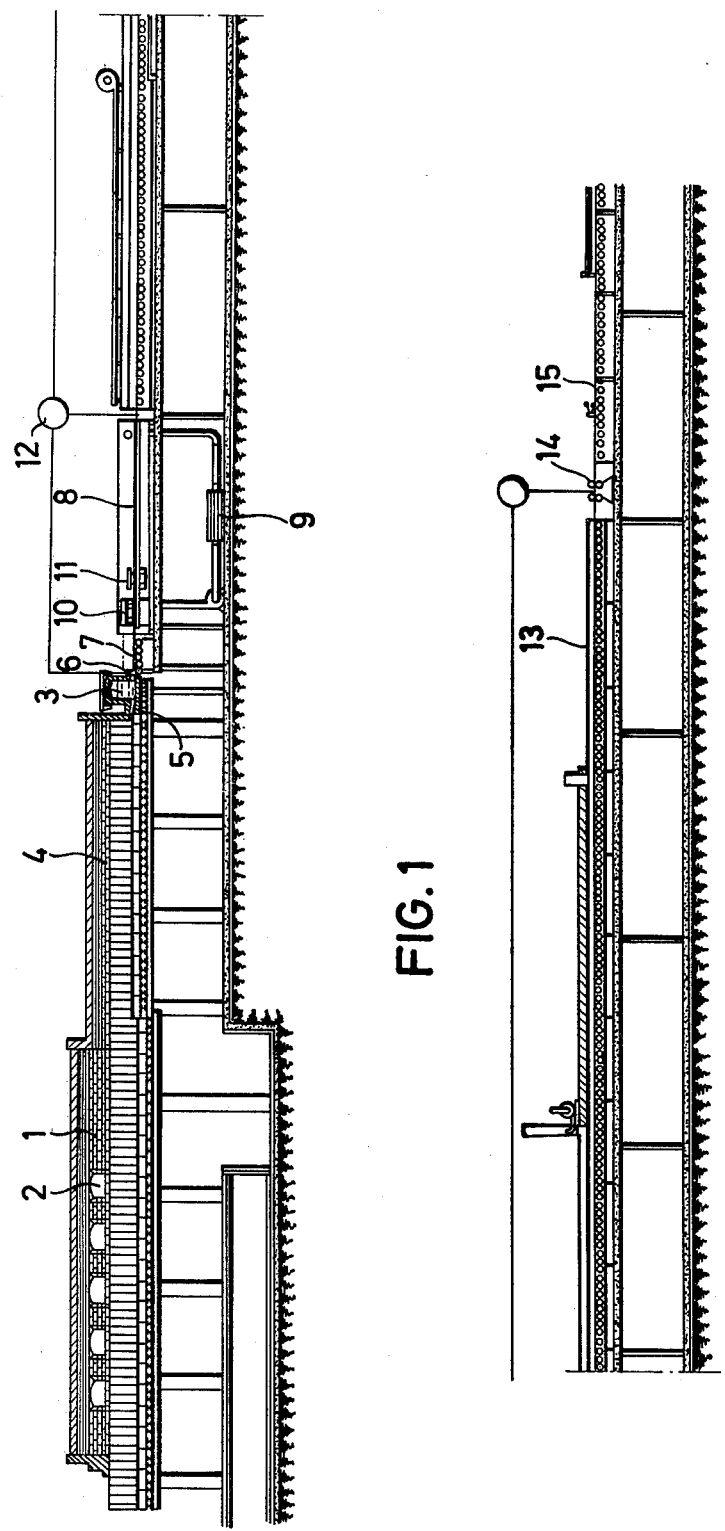
FIG. 1 shows the total view of an installation according to the invention, for the production of plate-glass, partially in diagram.

In FIG. 1, the reference character 1 designates the melting furnace, which may be heated selectively by means of oil or gas, as here indicated by the burner openings 2, however, also may be heated electrically. The melting furnace 1 possesses in direction of the outflow-furnace 3 a purification part or clarification part 4. From the clarification part 4, the glass on the bottom is taken particularly over a threshold or sill through the conveyor channel 5 and introduced likewise on the floor into the outflowfurnace 3. The glass leaves the outflow furnace 3 as flat-glass-band through the flat nozzle 6, which is arranged opposite the transfer-channel 5 on the floor of the outflow furnace 3. Behind the flat nozzle 6 are arranged smoothing- and cooling-apparatus, here adjustable cooling-rollers 7, to which in this embodiment the gas-cushion-table 8 is attached, to which by means of a heating apparatus 9, hot carrier air according to zones is supplied. In the area of the hot-gas-cushion-table 8 is still applied a hold-down device in form of a gas cushion 10 or a roller, which takes care of transition free from difficulty, of the glass band to the hot-gas-cushion-table 8. In the area of the hot-gas-cushion-table there is still arranged a fire-polishing device 11, which may be disposed both above as well as also underneath the glass band.

To the hot-gas-cushion-table 8 is attached in this example the device 12 for measuring glass thickness, for the regulation of the glass-temperatures in front of the nozzle, which may besides influence the outflow-speed. Behind the device 12 for measuring thickness of the glass follows the cooling furnace 13, known per se, which has different temperature zones and leaves the glass band with so low temperature that it may subsequently be subjected to a quality control, and then passes through the transporting rollers 14. Behind the transporting rollers 14, the glass reaches the cutting part 15.

Figure 2:
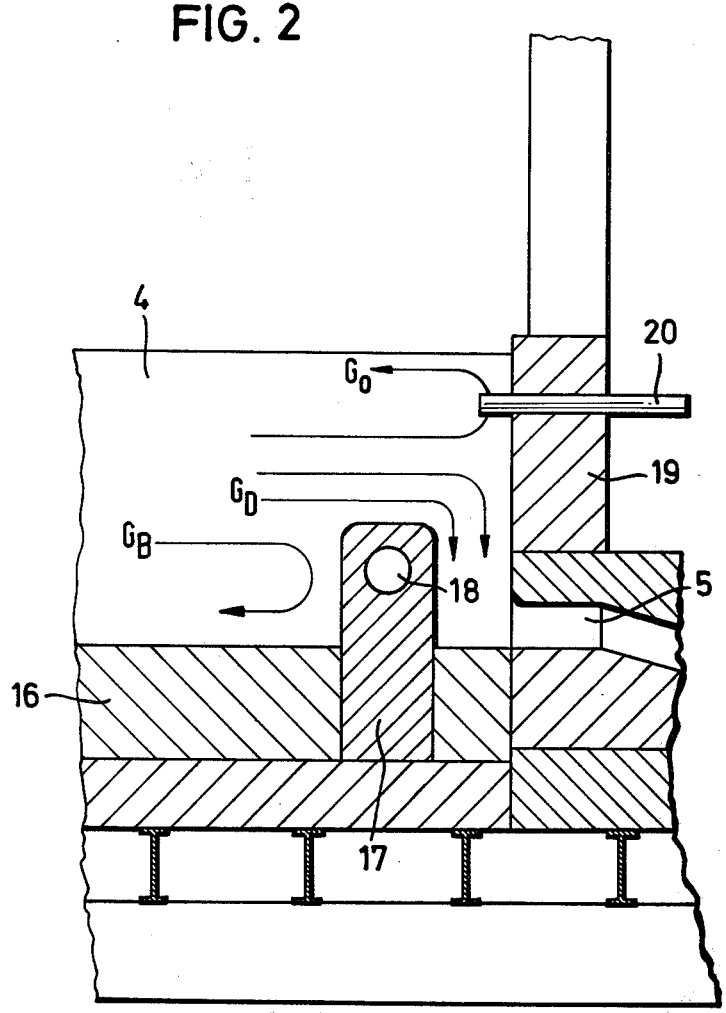
FIG. 2 shows the diagrammatic construction of the removal side of the melting furnace.

In FIG. 2, 16 designates the bottom masonry of the clarification part 4 of the glass-melting-furnace, in which the threshold 17 is arranged in front of the transfer channel 7. In the threshold or sill 17 is disposed a cooling device 18 and in the front wall 14 are arranged the heating electrodes 20. The cooling or heating, respectively, of the glass brings it about that the glass movement adjusts itself, shown diagrammatically by means of the movement-arrows $G_O$, $G_B$ and $G_D$. $G_O$ designates in this connection the surface glass, $G_D$ the glass flowing to the nozzle and $G_B$ the bottom glass.

Figure 3:
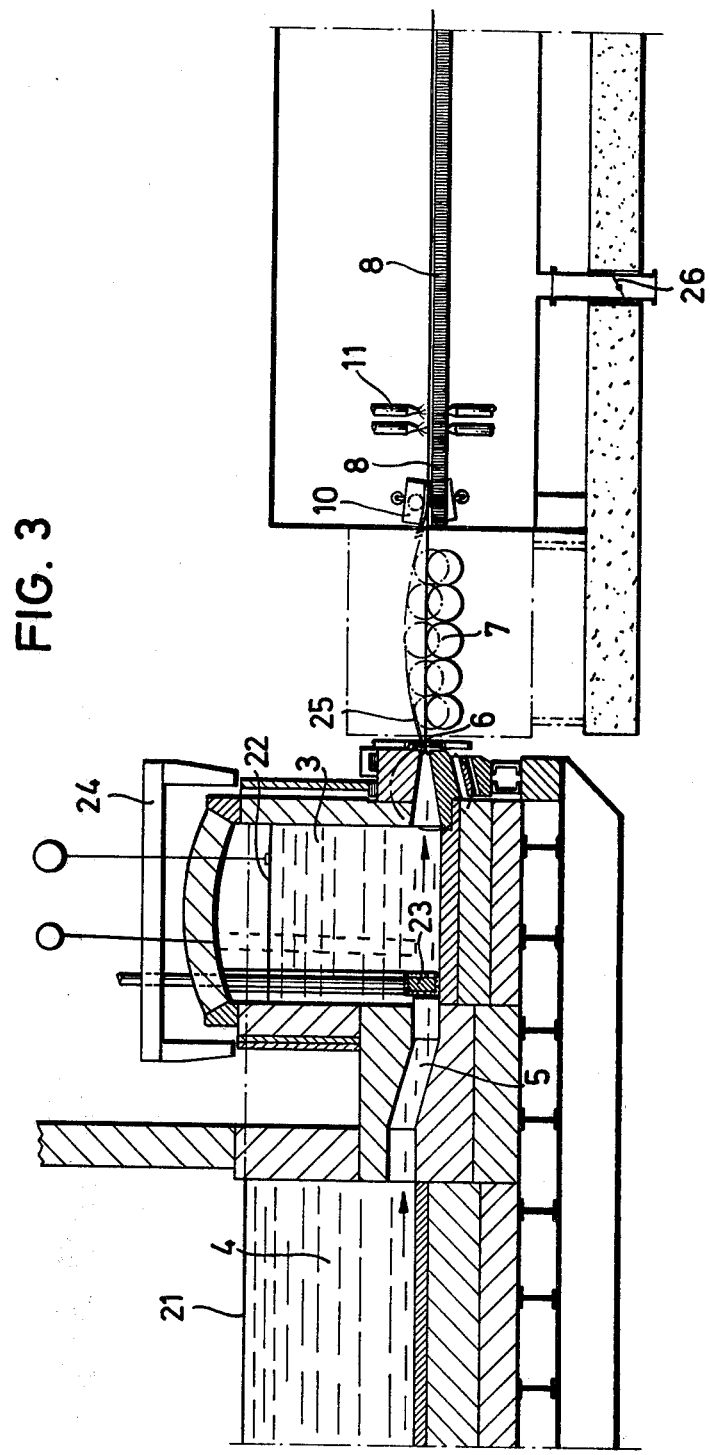
FIG. 3 shows on a larger scale the outflow-furnaces and flat nozzle area of FIG. 1 with heat-offtake-body in several parts.

In FIG. 3, 21 designates the level of the glass in the clarification part 4 of the melting furnace and 22 the level of the glass in the outflow-furnace. Between the melting furnace 4 and the outflow-furnace 3 is located the transfer channel 5, which preferably is carried out easily dropping and on account of its width, which corresponds somewhat to the width of the outflow nozzle, has preferably longitudinally-extending supporting elements. At the end of the transfer channel 5 is located the locking-slide or gate valve 23 as device regulating the flow-through quantity, said gate valve or locking slide member regulating the supply of molten glass into the outflow chamber 3. It consists preferably of ceramic which is metal-plated on the outside. The metal-plating is constructed simultaneously as resistance element for a heating of the gate valve. Hereby, with a standstill of operation and/or an evacuation of the outflow chamber 3, a freezing or congealing of the slide-member is prevented.

In the outflow chamber 3 are located here only indicated measuring- and regulating-members for the condition and the level height of the glass which take care that level height and bath-characteristics, particularly the viscosity correspond with the desired qualities of the glass and the desired production data. On the floor of the outflow-furnace 3 is arranged the nozzle 6 which has nozzle-girders not shown in greater detail. About the outflow-furnace 3 is arranged a protective housing 24, which likewise rests on the furnace-foundation and shields the outflow furnace towards the outside.

Behind the nozzle 6 are located as heat offtake bodies the smoothing- and cooling-rollers 7 which receive the glass band 25 issuing from the nozzle 6. They are preferably constructed adjustable as to height. Attached to the smoothing- and cooling-rollers 7 is arranged a hold-down member 10 which here is constructed as gas-cushion. Behind the smoothing and cooling-rollers 7 may eventually be located calibrating rollers. To the hold-down member 10 is attached the gas-cushion-table 8. In the area of the gas-cushion-table are disposed advantageously devices 11 for the fire-polishing, for example, short-flame gas-burners. At this point is utilized the fact that here the glass band 25 is still present with hot core and already cooled surface, so that in the surface, appreciable tensional residual stresses have built up.

Figure 4:
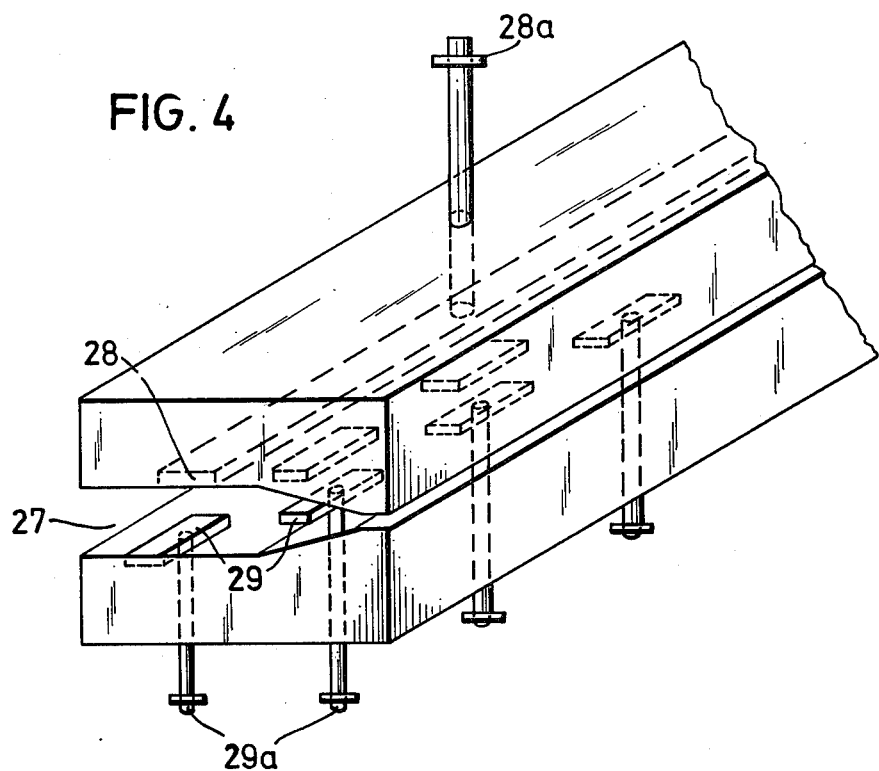
FIG. 4 shows the arrangement of the band- and plate-electrodes in the feed channel to the nozzle.

In FIG. 4, 27 designates the channel of the outflow-furnace 3 to the nozzle 6, on whose upper side the continuous band electrode 28 and on whose lower side the plate electrodes 29 are entered into the masonry. The electrodes 28 and 29 are connected through electro-contacts or terminals 28a, 29a with regulable sources of voltage, so that the flow-through of the hot current through the glass in each case may be adjusted individually for the area through each plate-electrode.

The principle serving as basis for the heating procedure is the ohmic heating of the molten glass passed through by current. The specific electric resistance of the molten glass is in reverse relation to its temperature. According to the ohmic law, the resistance and therewith the temperature, is constant, when the quotient of voltage and current is constant:

$$\frac{U}{g} = R = A \cdot \frac{1}{T} = \text{const.}$$

Through raising the voltage, the current and therewith the supply of energy is increased. The temperature increases and the viscosity drops.

Figure 5:
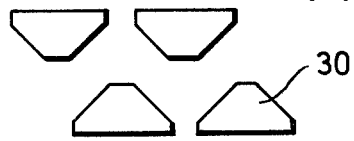
FIG. 5 shows the form of the plate electrodes.

The form of the plate-electrodes is to be inferred from FIG. 5. There are utilized preferably trapeze-shaped plate-electrodes 30 with differently great ratio from length to width. The electrodes 30 are therefore constructed trapeze-shaped in order to bring about that the course of the current supply over adjacent electrodes is more constant (the adaptation is attained through the covering triangular parts of the electrodes) and that the flow of current between the individual electrodes having as a rule, different voltage is as small as possible.

Figure 6:
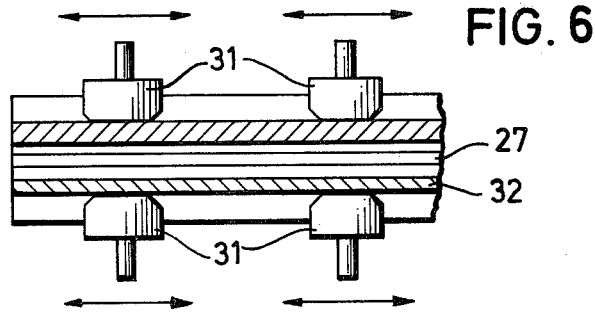
FIG. 6 shows the embodiment with conveyable guide-electrodes.

The embodiment of the slide-electrodes is shown in FIG. 6. Between the feed channel 27 to the nozzle, which is shown cut, and the slide-electrodes 31 in which the arrows indicate the conveyability, is arranged a conducting ceramic material 32, through which the current enters into a wide stray-field in the glass. In FIG. 6 are provided upper- and lower-side of the supply channel 27 to the nozzle with slide-electrodes. The upper side may however also for example be provided with a band-electrode 28 and solely the lower side may have the conveyable slide-electrodes 31.

In FIG. 7, 6 designates the diagrammatically shown nozzle, in which the glass-band is formed, 33 the cooling drum or cooling-roller and 34 the smoothing-over-drum or -roller for the glass band 25. The glass band 25 issuing out of the nozzle 6 is taken up by the drum/-roller 33 and transported further to the gas-cushion-table 8. In the interior of the drum/roller 33 are present indicated spray-nozzles 34' which spray a cooling liquid on the inner surface of the drum-roller 33. The quantity of cooling liquid is approximately so adjusted that the glass band upon raising from the drum/roller 33 has a temperature of circa 800°. The drum/roller 33 is positioned on a frame 35 which is conveyable over wheels 37 on the rails 36, so that at any time it is possible to convey the roller out of the band-area and into another apparatus. The drive of the drum-roller 33 takes place through a motor, not shown, with continuous regulation of the rate of rotation which advantageously is controlled through the sag-curve of the glass band 25 between the nozzle 6 and the take up point of the glass band 25 on the drum/roller. As cooling liquid, water or oil in closed circuit comes into consideration.

FIG. 8 shows the construction of the heat-takeoff body as metal band 38. The band 38 which is guided and driven by the rolls 39 takes up the glass band 25 issuing out of the nozzle 6 preferably somewhat at the same height as the nozzle 6. The band 25 lies flat on the band 38 which preferably consists of thin metal resistant to high heat, which is ground and polished. The band 38 is likewise cooled by means of spray nozzles 40. Through the large deposit-surface and the possibility of elongating the band 38 as desired, in this embodiment also easily a rapid deeper cooling is possible than in the temperature-range of 750° to 850° Celsius. The band 38 is likewise arranged conveyable in and out on a frame 41 with wheels 42, and may accordingly be exchanged for a cooling-drum/roller or a cooling bath. After cooling on the band 38, whose end roll is advantageously hydraulically tensioned in order to hold the band 38 always even, the glass band 25 is moved on over the gas-cushion-table 8 and previously or at the beginning of the gas-cushion-table is likewise subjected in manner not shown to a fire-polishing.

Figure 9:
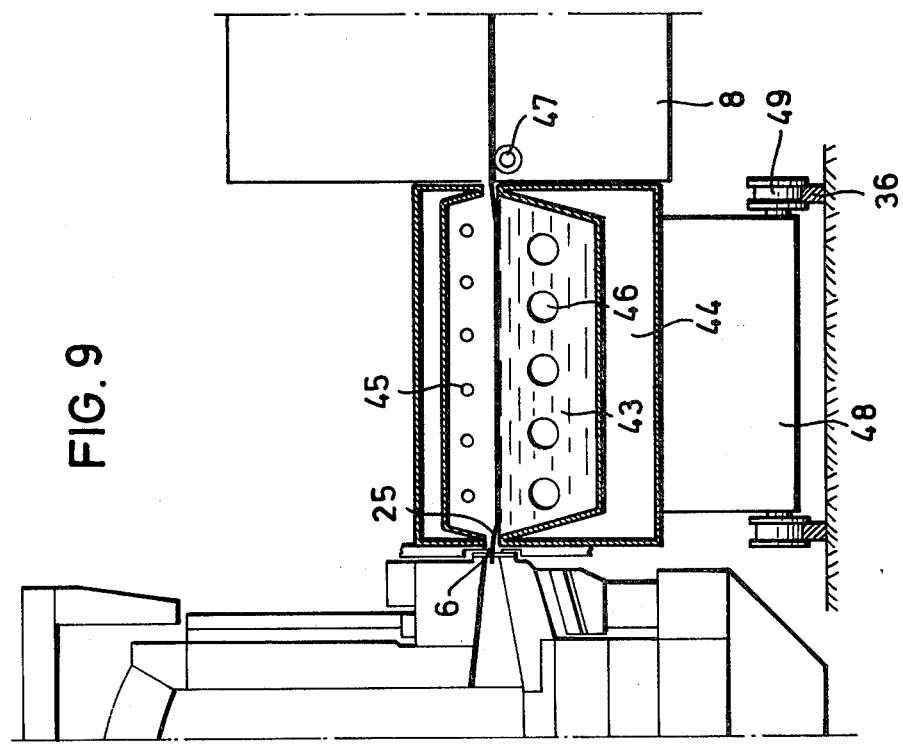
FIG. 9 shows a metal bath heat offtake body as well as, finally.

FIG. 9 shows the construction of the heat-offtake body as metal bath. Out of the nozzle 6 the glass band 25 in this connection arrives at the surface of the molten metal 43, which is located in the furnace or vat 44. The furnace or vat 44 is provided with temperature regulating devices particularly with cooling pipes 45 and 46 in the upper part and lower part. A guide- and drive-roll 47 lifts off the glass band 25 in usual manner and conducts it over the hot-gas-cushion-table 8. With this construction, the underside treatment of the glass band through fire-polishing may be eliminated.

Also the bath 43 of molten metal may be arranged on a frame 48 which is conveyable over the rollers 49 on the rails 36.

Figure 10:
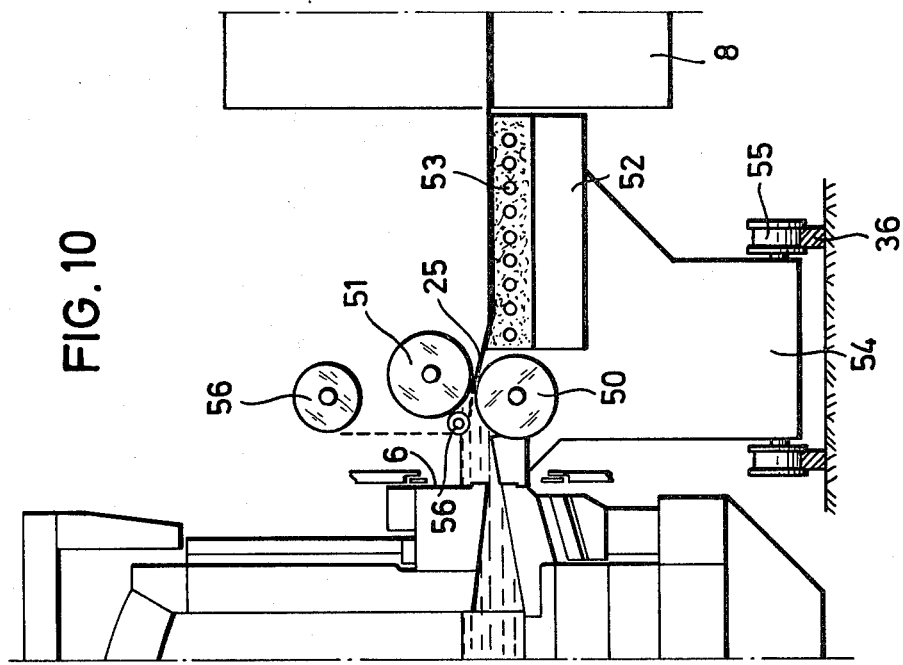
FIG. 10 shows a heat-offtake-body as ornamental glass swaging apparatus with wire-lattice feed device.

FIG. 10 shows a construction which is suitable for the production of ornamental and/or wired glass. Here the heat offtake body is divided into two oppositely disposed rolls 50, 51 which at the same time form and cool the glass band 25 forming in the roller-gap. After the passage through the forming rolls 50, 51, the glass band reaches a take up plate 52 which is formed or constructed as gas-cushion table and preferably has the cooling elements 53 for additional cooling. Here takes place an after-cooling. The two forming rolls 50, 51 are mounted in common with the gas-cushion-table 52 on a car 54 which is conveyable over the rolls 55 on the rails 36. The wire insert is supplied through the rolls 56. In succession to the receiving plate 52, the glass band 25 reaches the main air-cushion-table 8.

In the production of wired- and ornamental glass, the nozzle 6 is entirely opened, as shown in FIG. 10. In this connection, the level of the molten glass both directly in front of the forming rolls is determined by the state of the molten glass both in the outflow furnace, as both baths communicate unthrottled through the nozzle.

The production of ornamental glass may however, also take place in the manner that first a glass-band is formed in the nozzle, which then runs into the swaging rollers.

For the course and regulation of the method according to the invention, the following is to be noted:

The glass melted in the melting furnace moves through the removal of the glass out of the nozzle, out of the clarification part 4 of the melting furnace 1 out over the threshold or sill 17 into the channel 5 which leads to the outflow furnace 3. Out of the drawing furnace 3, it arrives in the channel 27 in which, regulated according to the deviations in measurement of the finished glass band, it is heated over the cross-section selectively by the electrodes 28, 29, 31. In the normal case, the temperature of the glass issuing from the nozzle is selected somewhat higher than the glass entering into the channel 27, so that a constant slight heating of the glass takes place in the supply channel 27. Hereby, care is taken for a stable regulation. Behind the nozzle 6 which is located at the outflow of the channel 27 are arranged devices measuring the glass thickness 12, which continuously measure the glass thickness and impart deviations to a regulating device for the electrode-voltage. The latter raises or lowers according to the voltage in the electrodes, so that the deviations are adjusted through equalizing different electric current through the glass, and the individual partial streams of glass are heated corresponding to the particular deviation.

The production output in the procedure according to the invention is directly dependent on the hydrostatic amount of pressure utilized of the molten glass $\dot{G} \sim \sqrt{h}$. In connection with temperature changes which lead to a change in the viscosity of the molten glass there results a possible variation in the quantity of production, as it could by far not be attained by other methods.

If, for example, the starting speed $V_D$ calculated and the outflow output $\dot{G}$ for a glass-melt of the viscosity $\mu = 10^4 P$ (so-called treatment viscosity) and if one assumes thereby a nozzle-gap-width of 4 m and a gap height of 4 mm, there results for a level height $$h = 1 \text{ m}$$

$$\frac{V_D = 0.43 \text{ m/s} = 1548 \text{ m/h}}{\dot{G} = 1480 \text{ t/24 h, and at}}$$

$$h = 0.2 \text{ m}$$

$$\frac{V_D = 0.09 \text{ m/s} = 324 \text{ m/h}}{\dot{G} = 300 \text{ t/24 h}}$$

As on the one hand in the temperature range coming into question for the processing, the viscosity of the glass-melt at small temperature changes, appreciably shifts, on the other hand, the viscosity influences very strongly the friction losses in the nozzlestone, which dissipate or consume by far the greatest part of the potential pressure energy $\gamma_{GL} \times h$, by means of a relatively low or slight drop in temperature of the glass-melt, its outflow speed and thereupon the production quantity permits of being greatly reduced. If, for example, the temperature is lowered by circa 50° C. (from 1028° C. to 975° C.), then the viscosity amounts to $\mu = 2.21 \times 10^4 P$. With otherwise the same data, one obtains now for $$h = 1 \text{ m}$$

$$\frac{V_D = 0.2 \text{ m/s} = 720 \text{ m/h}}{\dot{G} = 690 \text{ t/24 h and for}}$$

$$h = 0.2 \text{ m}$$

$$\frac{V_D = 0.043 \text{ m/s} = 155 \text{ m/h}}{\dot{G} = 145 \text{ t/24 h.}}$$

It is recognized that with a further lowering of temperature, without further ado, also production quantities may be attained between circa 20t/24h and circa 100t/24h. In this connection, it is to be considered that a temperature below 1000° C. indeed the friction of the glasses on the nozzle girders appreciably increases, the heat- and temperature-resistance of the charging materials however increases by leaps. The durability of the nozzle girders is on account of this changing effect, relatively independent of the operational temperature.

We claim as our invention:

1. A method for production of plate glass, comprising the steps of: melting glass in a continuous glass melting furnace; conveying the melted glass to a lower portion of an outflow furnace; forming a glass band by free outflow from a lower portion of the outflow furnace through an outflow nozzle connected to the outflow furnace at the lower portion thereof; and controlling the free outflow by altering a height of the level of the molten glass in the outflow furnace by controlling glass inflow to the outflow furnace.

2. A method for production of plate glass according to claim 1, including the further step of conveying the melted glass located in a lower portion of the continuous glass melting furnace directly into a lower part of the outflow furnace.

3. A method for production of plate glass according to claim 1, including the further step of utilizing glass disposed in a lower part of the glass melting furnace for the production of the plate glass.

4. A method for production of plate glass according to claim 1, including the further steps of taking the glass from a molten layer which is spaced from a surface of the molten glass and to a floor of the glass melting furnace; and on its way from the outflow furnace to the nozzle subjecting the glass to an after-heating.

5. A method for production of plate glass according to claim 1, including the further step of adjusting streams of glass circulating adjacent surfaces of the glass melting furnace by heat transfer.

6. A method for production of plate glass according to claim 1, including the further step of having the glass leave the melting furnace past a cooled upwardly extending sill member.

7. A method for production of plate glass according to claim 4, including the further step of regulating the after-heating before the nozzle via the nozzle width.

8. A method for production of plate glass according to claim 4, including the further step of using a thickness of the glass band for regulation of the after-heating.

9. A method for production of plate glass comprising the steps of: melting glass in a glass melting furnace; conveying melted glass from a lower part of the melting furnace to a lower part of an outflow furnace; conveying melted glass from a lower part of the outflow furnace through an outflow nozzle to form a flat glass band; and regulating outflow speed of the glass out of the nozzle by static pressure before the nozzle.

10. A method for production of plate glass according to claim 1, including the further steps of conveying the plate glass from the outflow furnace through a nozzle whose outlet opening substantially corresponds to a width and thickness of a finished flat band of plate glass.

11. A method for production of plate glass according to claim 1, including the further steps of providing an outflow of the glass from the melting furnace over an entire width of the melting furnace, said entire width corresponding approximately to a width of the outflow nozzle which connects to the outflow furnace.

12. A method for production of plate glass according to claim 1, including the further step of regulating a quantity of the glass flowing into the outflow furnace from the melting furnace by means of a regulating member on a channel between the melting furnace and the outflow furnace.

13. A method for production of plate glass according to claim 1, including the further step of regulating dimensions of an outflow gap of the outflow nozzle.

14. A method for production of plate glass according to claim 1, including the further steps of quickly bringing the glass after outflow from the nozzle to a temperature range in which it is viscously plastic in a temperature range between 750° C. and 850° C.

15. A method for production of plate glass according to claim 14 including the further steps of cooling in the viscous plastic condition takes place through direct heat transfer to a solid or liquid body.

16. A method for production of plate glass according to claim 1, including the further steps of smoothing and cooling the plate glass after its outflow from the nozzle by means of at least one heat take-off apparatus.

17. A method for production of plate glass according to claim 16, including the further step of fire polishing the flat glass band formed behind the heat take-off apparatus.

18. A method for production of plate glass according to claim 16, including the further steps of conveying the flat glass band from the heat take-off apparatus to a carrying hot gas layer and heat treating.

19. A method for production of plate glass according to claim 18, including the further step of conveying the flat glass band to the carrying hot has layer in a separate cooling furnace.

20. An apparatus for production of plate glass, comprising:
(a) a continuous glass melting furnace;
(b) an outflow furnace;
(c) a glass outlet channel connecting a lower part of the melting furnace to a lower part of the outflow furnace and control means in the outlet channel for discharging glass into the outflow furnace in a variably controllable manner;
(d) outflow nozzle means connected to a lower portion of the outflow furnace for forming a flat glass band by free outflow; and
(e) means for regulating the free outflow speed of glass out of the nozzle means by producing static pressure at an inlet to the nozzle means, said means for regulating comprising means for adjusting the height of glass present in the outflow furnace.

21. An apparatus for the production of plate glass comprising:
(a) a continuous glass melting furnace;
(b) an outflow furnace;
(c) a glass outlet channel connecting a lower part of the melting furnace to a lower part of the outflow furnace for discharging glass into the outflow furnace;
(d) outflow nozzle means connected to the outflow furnace at a lower portion of the furnace for forming a flat glass band;
(e) means for regulating outflow speed of glass out of the nozzle means by producing static pressure at an inlet to the nozzle means; and
(f) the nozzle means having means for changing a gap width and a gap breadth of the nozzle means as an outlet opening for the glass.

22. An apparatus for the production of plate glass according to claim 20 characterized in that the melting furnace has at an outflow side an upwardly projecting member having cooling means, and that above the upwardly projecting member is arranged a heating apparatus comprising electrodes.

23. An apparatus for the production of plate glass according to claim 20, characterized in that a supply channel between the outflow furnace and the nozzle means has temperature equalization electrodes.

24. An apparatus for the production of plate glass according to claim 23 characterized in that the supply channel temperature equalization electrodes are arranged above and below the supply channel as heating electrodes, the heating electrodes comprising at least one continuous band electrode and a plurality of individual plate electrodes.

25. An apparatus for the production of plate glass according to claim 24 characterized in that the individual plate electrodes lie opposite the continuous band electrode and are constructed of trapezoid shape and are arranged in two rows, the second row covering openings between electrodes of the first row.

26. An apparatus for the production of plate glass according to claim 24 characterized in that the band electrode and the individual plate electrodes are embedded in a conducting ceramic material.

27. An apparatus for the production of plate glass according to claim 26 characterized in that the embedding material contains particle means for increasing the conductance of the material.

28. An apparatus for the production of plate glass according to claim 24 characterized in that the heating electrodes are arranged movably and are movable into control positions corresponding to dimensions of the nozzle means.

29. An apparatus for the production of plate glass according to claim 20 characterized in that at a transition from the melting furnace to the outflow furnace, a regulating device means for flow-quantity control is provided, and in the outflow furnace a measuring and regulating device means is arranged for the glass level height control and glass condition.

30. An apparatus for the production of plate glass according to claim 20 characterized in that directly behind the nozzle means is arranged a liquid cooled heat take-off apparatus which is in contact with the glass band issuing from the nozzle means.

31. An apparatus for the production of plate glass according to claim 30 characterized in that the heat take off apparatus comprises a displaceable cooling roller.

32. An apparatus for the production of plate glass according to claim 30 characterized in that the heat take-off apparatus comprises a metal band arranged on a displaceable frame.

33. An apparatus for the production of plate glass according to claim 30 characterized in that the heat take-off apparatus comprises a cooling bath of molten metal covered by a protective atmosphere.

34. An apparatus for the production of plate glass according to claim 30 characterized in that the heat take-off apparatus comprises an ornamental glass finishing apparatus which has a cooled gas cushion table.

35. An apparatus for the production of plate glass according to claim 30 characterized in that at an inlet side of the heat take-off apparatus is arranged a wire lattice supply device.

36. An apparatus for the production of plate glass according to claim 30 characterized in that on an upper side of the glass band is arranged a smoothing over roller polished to a high gleam.

37. An apparatus for the production of plate glass according to claim 30 characterized in that behind the nozzle means are arranged heat treatment devices.

38. An apparatus for the production of plate glass according to claim 37 characterized in that at the heat treatment apparatus is arranged at least one gas cushion table.

39. An apparatus for the production of plate glass according to claim 20 characterized in that on the glass band are arranged device means for measuring a thickness of the glass.

40. An apparatus for the production of plate glass according to claim 20 characterized in that the surface of the nozzle means has a wear-protection comprising metal carbide.

41. An apparatus for the production of plate glass according to claim 20 characterized in that the nozzle means is constructed as a flat nozzle and has nozzle bars which are provided as several individually adjustable parts.

42. An apparatus for production of plate glass, comprising:
(a) a continuous glass melting furnace;
(b) an outflow furnace;
(c) means for transferring in a variable controllable manner molten glass in the glass melting furnace to a lower portion of the outflow furnace;
(d) outflow nozzle means connected to receive molten glass from a lower portion of the outflow furnace; and
(e) means for regulating a free outflow speed of the glass out of the nozzle means independent of free outflow from the nozzle means by flow pressure regulation of molten glass in the outflow furnace, said means for regulating comprising means for adjusting a height of a level of the glass in the outflow furnace.

43. The apparatus of claim 42 wherein the means for transferring includes means for obtaining central layers of molten glass to the exclusion of top and bottom layers in the glass melting furnace.

44. A method for production of plate glass, comprising the steps of:
(a) melting glass in a glass melting furnace and conveying it to a lower portion of an outflow furnace;
(b) forming a flat glass band by free outflow with an outflow nozzle from glass at a lower portion of the outflow furnace;
(c) regulating outflow speed of melted glass through the outflow nozzle by controlling a flow pressure of glass fed to the nozzle in the outflow furnace separate from the glass melting furnace and by adjusting a height of the level of the glass in the outflow furnace; and
(d) taking glass for the outflow furnace from portions of molten glass in the glass melting furnace spaced from the bottom and top levels of the molten glass in the glass melting furnace, the amount of glass taken from the outflow furnace being selectively controllable so as to control a quantity of glass in the outflow furnace.

* * * * *